United States Patent [19]

Anderson

[11] 3,848,191

[45] Nov. 12, 1974

[54] ASYNCHRONOUS PULSE RECEIVER

[75] Inventor: Leonard Hugo Anderson, Sun Valley, Calif.

[73] Assignee: RCA Corporation, New York, N.Y.

[22] Filed: July 7, 1972

[21] Appl. No.: 269,537

[52] U.S. Cl. .................. 325/326, 178/88, 325/323, 325/408, 325/479

[51] Int. Cl. ............................................ H04b 1/16

[58] Field of Search ........... 325/326, 397, 400, 401, 325/402, 408, 479, 482, 410, 473, 478, 323, 324; 178/68, 88; 343/5 AGC, 7 A, 17.1 R; 179/15 BA, 15 BS

[56] References Cited

UNITED STATES PATENTS 2,747,179 5/1956 Kaplan .............................. 325/323

3,309,611 3/1967 Bainum ............................ 325/401

*Primary Examiner*—Robert L. Griffin
*Assistant Examiner*—Marc E. Bookbinder
*Attorney, Agent, or Firm*—George J. Seligsohn; Edward J. Norton

[57] ABSTRACT

The use of a broad-band, amplitude-limited IF amplifier, whose gain is controlled in accordance with a fedback AGC noise voltage, permits a receiver to resolve the pulses of a received stream of asynchronously-occurring short duration pulses whose amplitude distribution among successive pulses varies over a large dynamic range.

14 Claims, 5 Drawing Figures

ASYNCHRONOUS PULSE RECEIVER 100

ASYNCHRONOUS PULSE RECEIVER 100

ASYNCHRONOUS PULSE RECEIVER

This invention relates to pulse receivers and, more particularly, to pulse receivers for receiving a stream of asynchronously-occurring pulses.

A stream of asynchronously-occurring pulses, as used herein, is one in which time of occurrence of any pulse in the stream is unrelated to and is unpredictable from the time of occurrence of any pulse in the stream. Furthermore, there is no prior knowledge at the pulse receiver as to when the next pulse in the stream will be received. Thus, it is not possible to employ range gating in the receiver for receiving asynchronously-occurring pulses in order to decrease received noise and increase the signal-to-noise ratio, as is usually done in a pulse receiver for receiving a stream of synchronous pulses.

In those cases where relative motion exists between a pulse transmitter and a pulse receiver, such as in aircraft telemetry, radar beacons and ATC transponders, by way of example, pulses received by a pulse receiver usually occur asynchronously. Furthermore, in the case of a pulse receiver which is continuously listening for the receipt of pulse-coded messages, each of which is synchronous within itself, but which are asynchronous with respect to each other, the same problem of relatively high received noise and relatively low signal-to-noise ratio exists.

Another problem with which an asynchronous pulse receiver must often contend is that successive pulses in the received pulse stream may have arisen from different pulse transmitters and be received with vastly different powers (because of the different transmitted powers among the pulse transmitters, difference in the distance among the pulse transmitters from the pulse receiver, or both). For example, this latter problem is encountered in the receiver of a radar beacon which during the same time interval may be addressed by a plurality of different aircraft at various distances therefrom. Therefore, such a pulse receiver must have a high dynamic range in order to be sensitive enough to receive the weakest pulse signal and still not be overloaded in response to the receipt of the strongest pulse signals. Furthermore, in the case where the duration of each pulse is quite short, such as one microsecond, for instance, and there is a reasonable probability that successive asynchronously occurring pulses having vastly different power levels will be received with the spacing therebetween not much greater or even less than this short duration of a pulse, the pulse receiver must have a very fast response time in order to resolve closely-spaced successive pulses.

The problem of receiving with high resolution a stream of asynchronously-occurring pulses in which the distribution of amplitude among successive pulses of the stream varies over a relatively large dynamic range can occur, for example in the so-called SECANT aircraft anti-collision system, described in detail in copending U.S. Pat. application Ser. No. 27,403, filed Apr. 10, 1970 and issued Apr. 9, 1974 as U.S. Pat. No. 3,803,608, by Jack Breckman, and assigned to the same assignee as the present application. Therefore, although not limited thereto, for illustrative purposes, the present invention will be described in connection with the SECANT system. However, only that portion of the SECANT system helpful in appreciating the present invention will be described in the present application.

Briefly, all aircrafts in the SECANT system employ the same given set of signals for transmitting and/or receiving. This set of signals includes a plurality of frequencies at one megacycle intervals extending in the L band from 1592.5 MHz to 1622.5 MHz. Each respective one of the signals in the set, which has the same significance to all aircraft of the SECANT system, consists of a one-microsecond burst of one of the individual frequencies of the set, each frequency manifesting a different signal. Each of the frequency bursts constitutes a pulse. All aircraft are capable of receiving bursts at certain frequencies each of which manifests a probe signal and, in response thereto, transmitting a return pulse at another frequency which is selected in accordance with the frequency of the received probe pulse. Furthermore, many of the aircraft (but not necessarily all the aircraft) include means for transmitting as an interrogation signal the aforesaid probe pulses and receiving as responses the aforesaid return pulses. The transmission of probe pulses by any aircraft is non-synchronous with the transmission of probe pulses by any other aircraft.

If, as is often the case, many aircraft are within the same general vicinity and at least several of these aircraft are of the type which transmit probe signals and receive return signals, each of the aircrafts which are of the type which transmit probe pulses will receive a very complex stream of asynchronous pulses. In particular, each such plane will not only receive the probe signals transmitted by other aircraft in its vicinity, but will receive all the return pulses transmitted by all aircraft in its vicinity. Since the return pulses transmitted by any aircraft are in response to all probe pulses received thereby, the return pulses received by an interrogating aircraft will not only be in response to its own transmitted probe pulses, but also will be in response to the probe pulses of all other interrogating aircraft.

Due to the non-synchronous transmissions among aircraft and the different distances among aircraft, the distribution of amplitudes among successive pulses of such an asynchronously received stream by any aircraft will vary randomly over a relatively large dynamic range, such as 45 decibels by way of example. Since the SECANT system is an aircraft anti-collision system, it is very important that the pulse-receiver of interrogating aircraft be capable of receiving with high resolution the stream of asynchronously occurring one-microsecond frequency-burst pulses having amplitudes which are randomly distributed over a relatively large dynamic range. In order to achieve this resolution, the receiver must be capable of operating over the required large dynamic range of at least 45 decibels with a response time in the order of one microsecond or less.

The present invention is directed to an asynchronous pulse receiver for receiving as a signal a stream of asynchronously occurring pulses each consisting of a frequency burst of radio-wave energy having a given relatively short duration, the distribution of amplitudes among successive pulses of the stream varying over a relatively large dynamic range. Although not limited thereto, the present invention may be employed to provide an asynchronous pulse receiver capable of performing under the stringent conditions, discussed above.

These and other features and advantages of the present invention will become more apparent from the following detailed description, taken together with the accompanying drawing, in which.

Figure 1:
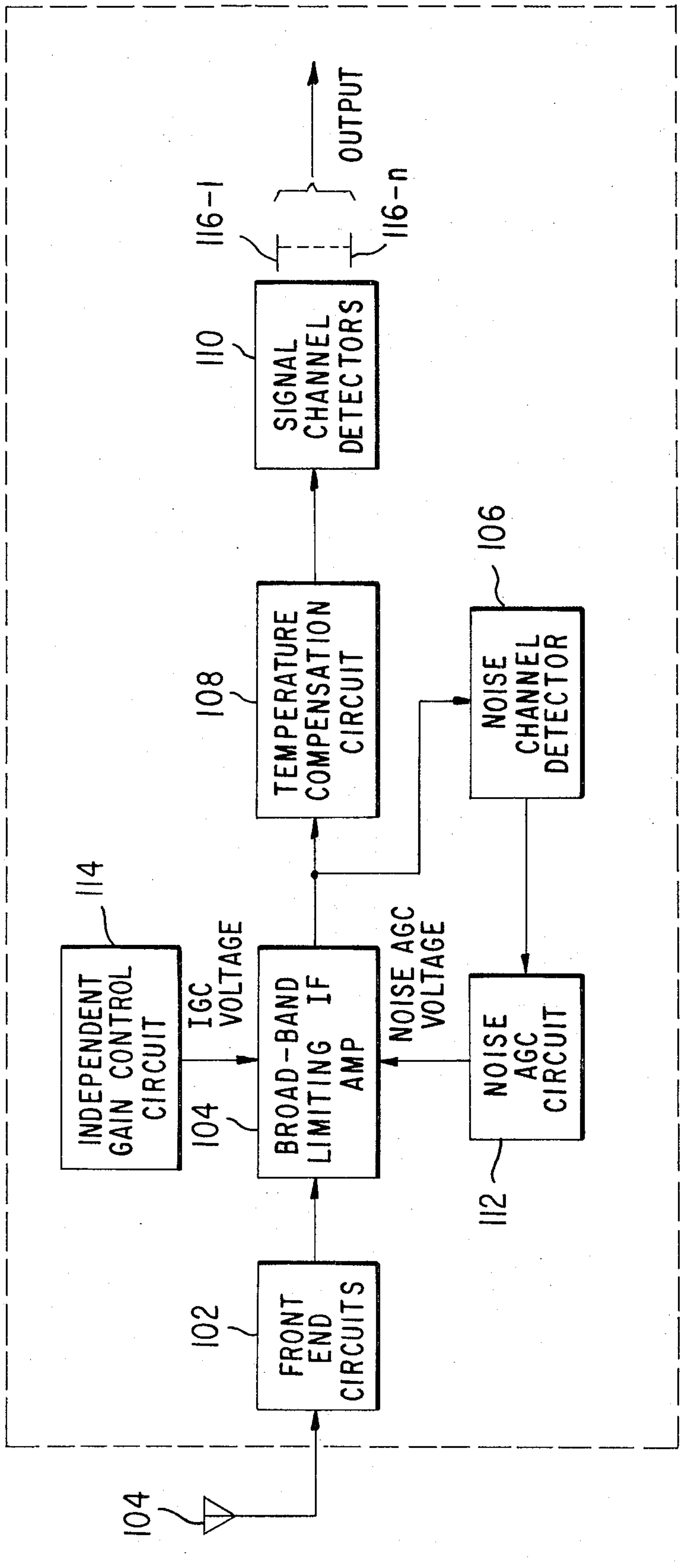
FIG. 1 is a block diagram of an asynchronous pulse receiver embodying the present invention.

Referring now to FIG. 1, there is shown asynchronous pulse receiver 100, which is assumed to be a superhetrodyne receiver. As is conventional, receiver 100 includes front end circuits 102, consisting of any required RF amplifiers and one or more mixers and local oscillators. Front end circuits 102 receives a stream of RF signal input pulses picked up by antenna 104 and converts them to IF signal pulses extracted as an output therefrom.

The output from front end circuits 102 is applied as an input to broad-band limiting IF amplifier 104. The output of broad-band limiting IF amplifier 104 is applied directly as an input to noise channel detector 106 and through temperature compensation circuit 108 as an input to signal channel detectors 110. The output from noise channel detector 106 is applied as an input noise AGC circuit 112, which develops a noise AGC voltage that is fed back as an automatic gain control voltage to broad-band limiting IF amplifier 104. The gain of broad-band limiting IF amplifier 104 may be also controlled by independent gain control circuit 114, which may be either a switch or an analog circuit.

Figures 2, 3:
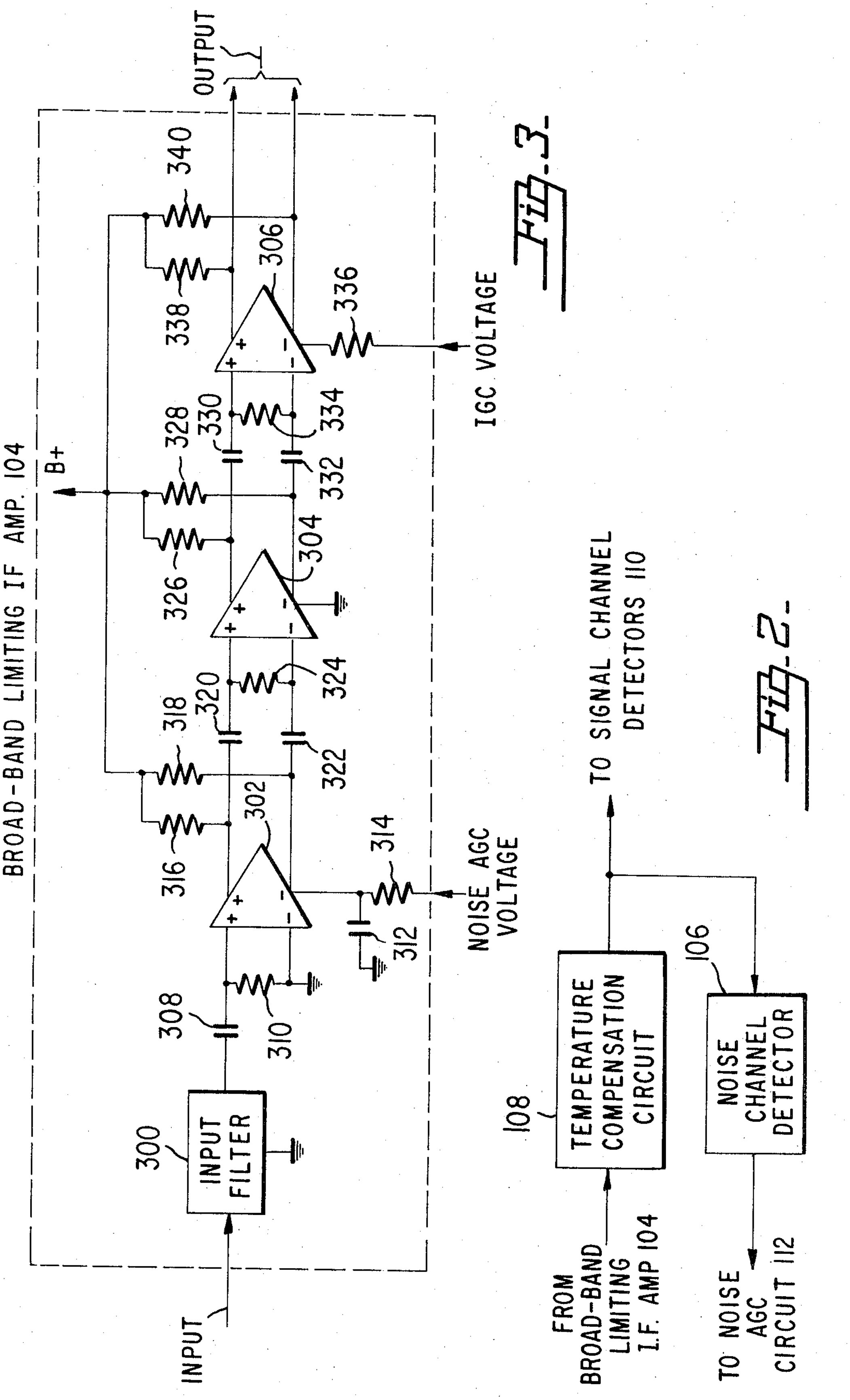
FIG. 2 illustrates a modification of the embodiment shown in FIG. 1.
FIG. 3 is a schematic diagram of a preferred form of the broad-band limiting IF amplifier employed in the asynchronous pulse receiver of FIG. 1.

In FIG. 1, temperature compensation circuit 108 is outside of the feedback loop extending from the output of broad-band limiting IF amplifiers 104, through noise channel detector 106 and noise AGC circuit 112 to the feedback input of the noise AGC voltage from circuit 112 to broad-band limiting IF amplifier 104. The arrangement of temperature compensation 108 is not essential. Alternatively, as shown in FIG. 2 the arrangement of asynchronous pulse receiver 110 may be modified so that the output from broad-band limiting IF amplifier 104 is applied through temperature compensation circuit 108 as inputs to both noise channel detector 106 and signal channel detector 110. In this latter case, temperature compensation circuit 108 is included in the feedback loop for the noise AGC voltage, rather than being excluded therefrom as is the case in FIG. 1. The present invention contemplates both the arrangements of FIG. 1 and FIG. 2.

The purpose of temperature compensation circuit 108, which includes an ambient-temperature sensor and an attenuator or amplifier whose attenuation or gain is a predetermined function of the sensed ambient temperature, will be discussed in detail below. In any case, while the inclusion of temperature compensation circuit 108 is to be preferred (and is therefore shown in FIGS. 1 and 2), it is not an essential element of applicant's invention and may be omitted. In the latter case, the output of broad-band limiting IF amplifier 104 would be directly coupled to the inputs of noise channel detector 106 and signal channel detectors 110.

The arrangements of FIGS. 1 and 2 employ a separate noise channel, which is distinct from any signal channel. In the case of the arrangements shown in FIGS. 1 and 2, the broad-band of frequencies passed by amplifier 104 includes one or more signal channels, in which both noise and signal may occur, and a noise channel in which only noise (but no signal) may occur. Thus, both noise channel detector 106 and signal channel detectors 110 include relatively narrow band filters for subdividing the broad-band of frequencies passed by amplifier 104. The noise channel detector and signal channel detectors comprise essentially the same structure, such as a filter and envelope detector shown in the aforesaid U.S. Pat. No. 3,803,608, which is well known to those skilled in the art of signal detectors. Although separate noise channel detection and signal channel detection is desirable, it is not essential to the present invention. Therefore, the present invention also contemplates the use of a common detector which detects both signal and noise.

In the SECANT system, as discussed above, a plurality of pulse signals at different individual frequencies are received. It is for this reason that block 110 include a plural number of signal channel detectors, each of which includes a separate filter tuned to the frequency of that signal for deriving a separate individual output 116-1 . . . 116–*n*. Of course, the present invention also contemplates an asynchronous pulse receiver employing only a single signal channel, rather than the multiple signal channels shown in FIG. 1.

Referring now to FIG. 3, there is shown a preferred version of broad-band limiting IF amplifier 104. Amplifier 104 includes an input filter 300 having the IF signal from the output of front end circuits 102 applied as an input thereto. Input filter 300 defines the broadband to be passed by amplifier 104. In general, input filter 300 may be bandpass, bandstop, low pass, high pass, or any combination thereof, to set the input frequency response of amplifier 104. However, as used in the SECANT system, input filter 300 is low pass, and the broadband passed by amplifier 104 in the SECANT system extends from about 9 to about 30 megahertz.

Amplifier 104 includes three cascaded amplifiers 302, 304 and 306. By way of example, each of amplifiers 302, 304 and 306 may consist of the high-grain integrated circuit designated MC1590G, manufactured by Motorola Semiconductor Products, Inc., and described more fully in their application note AN-513. Briefly, the MC1590 amplifier is a differential-input, differential-output, broad-band video amplifier with uncommitted output stage collectors, and cascode input stages with DC gain-control. Limiting occurs in between input and output stages of an MC1590 amplifier via saturation and cutoff when the input level is large. The DC gain-control of the MC1590 amplifier is a current input.

The output of input filter 300 is applied to the input of amplifier 302 through DC blocking capacitance 308 and resistance 310, which is the terminating resistance of filter 300.

The gain of amplifier 302 is automatically controlled by the AGC voltage applied thereto from noise AGC circuit 112 through resistance 314, which is used as a quasi-contact current converter to provide AGC current control from a voltage source. Capacitance 312 provides RF bypass.

A balanced output is obtained from amplifier 302 by means of load resistances 316 and 318, which are output collector loads connected to a point of fixed positive potential. Since the output stages of the MC159 amplifier are constant-current types, the gain of amplifier 302 is set by the value of load resistances 316 and 318.

The output from amplifier 302 is coupled to the input of amplifier 304 through DC blocking capacitances 320 and 322 and resistance 324. Resistance 324 provides a common input stage voltage for amplifier 304 and also affects gain by appearing as a differential shunt load to previous stage 302. In addition, the values of capacitances 320 and 322 have the value of resistance 324 are chosen in the SECANT system so that they operate as an R-C high pass filter which provides shaped low-frequency response.

In a similar manner, the output from amplifier 304, whose gain is constant, is derived across load resistances 326 and 328 and is coupled to the input of amplifier 306 through capacitances 330 and 332 and resistance 334, and the output from amplifier 306, which has its gain controlled by independent gain control voltage from circuit 114 applied thereto through resistance 336, is derived across load resistances 338 and 340. Load resistances 326 and 328 of amplifier 304 and load resistances 338 and 340 of amplifier 306 function in the same manner as load resistances 316 and 318 of amplifier 302, discussed above. Also, capacitances 330 and 332 and resistance 334, coupling the output of amplifier 304 to the input of amplifier 306, respectively correspond in function with capacitances 320 and 322 and resistance 324, discussed above, which couple the output of amplifier 302 to the input of amplifier 304. The purpose of resistance 336, which is the same as that of resistance 314 described above, is to operate as a quasi-constant-current inverter to provide current control from a voltage source. The independent gain control voltage may merely be a switch voltage to provide an output on-off control, or in the alternative, it may be variable to act as a gain control for broad-band amplifier 104 which is independent of the lever of the automatic gain control voltage supplied to amplifier 302.

One of the advantages of the broad-band amplifier 104 shown in FIG. 3 is that the limiting level at the output of amplifier 306, which constitutes the output of amplifier 104, is independent of the level of gain control applied to any of the cascaded stages of amplifier 104. Therefore, limiting will occur at the same relative level. Another advantage of the broad-band amplifier of FIG. 3 is that distortion is reduced by retaining differential coupling throughout the cascaded stages of broad-band amplifier 104.

Figures 4, 5:
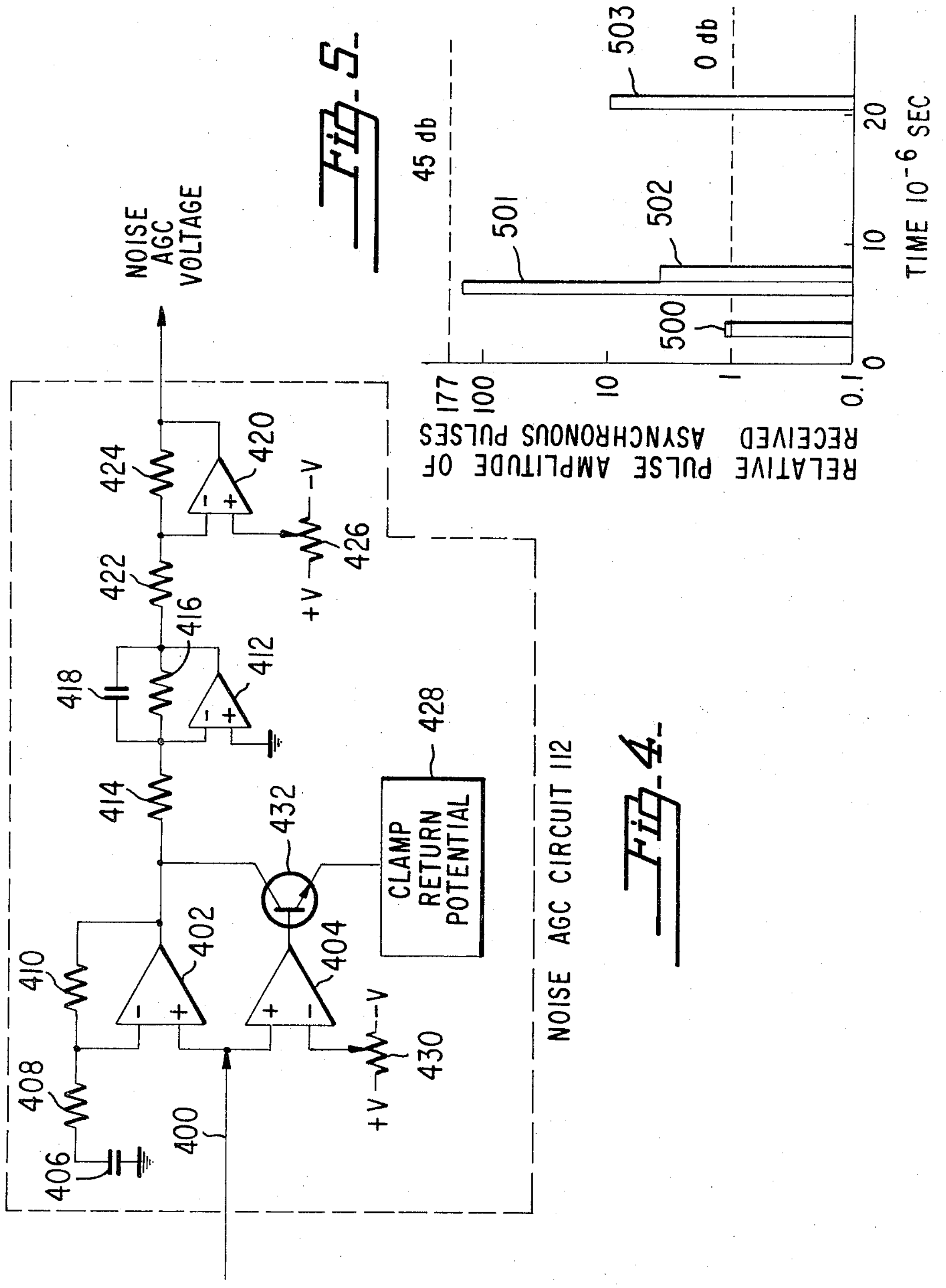
FIG. 4 is a schematic diagram of a preferred form of the noise AGC circuit employed in the asynchronous pulse receiver of FIG. 1.
FIG. 5 is a graph illustrating a stream of asynchronous pulses of the type received by the asynchronous pulse receiver of FIG. 1.

Referring now to FIG. 4, there is shown a preferred version of noise AGC circuit 112. The input to circuit 112, applied over a conductor 400, may be the output from noise channel detector 106, which includes no signal pulse component or, in the alternative, it may be the output from a common detector (not shown) which includes both a noise component and a signal pulse component. In either case, the input to noise AGC circuit 112 present on conductor 400 is applied as an input to both the low-frequency-limited amplifier 402 and comparator circuit 404. The respective values of capacitance 406, resistance 408 and 410, connected in FIG. 4, are selected to minimize the low-frequency noise fed through amplifier 402. The output from amplifier 402 is integrated by an integrator which comprises amplifier 412, resistances 414 and 416 and capacitance 418, connected as shown in FIG. 4. The integrator time constant, determined by the respective valves of resistances 414 and 416 and capacitance 418, are selected to minimize low-frequency noise fed through to the integrator output. The output of the integrator, which is a dc voltage proportional to the average noise voltage at its input, is further amplified by a circuit consisting of amplifier 420, resistances 422 and 424, and balance adjustment potentiometer 426, connected as shown in FIG. 4, to provide a noise AGC voltage as the circuit 112 output from FIG. 4.

In the case, discussed above, where the input to circuit 112 on conductor 400 is derived from noise channel detector 106, the noise level on conductor 400 will be proportional to noise at the input of pulse receiver 100 only so long as IF amplifier 104 is not in the process of limiting. However, during the occurrence of a signal pulse having an amplitude sufficiently high to cause limiting in IF amplifier 104, the noise level on input conductor 400 will be reduced by an amount which depends upon the input amplitude of the signal pulse then being amplified (the greater the amplitude of the signal pulse, the greater the reduction in the noise level). As is known, the reason for this is that noise quieting occurs in a limiting amplifier during intervals in which it is actually receiving an input sufficiently high to cause limiting to occur. Therefore, during these intervals, the input noise level on conductor 400 is not representative of the actual noise level at the input to pulse receiver 100. Therefore, in order to prevent erroneous changes in the average level being applied to the integrator input, the input to the integrator is clamped to a fixed clamp return potential 428, which is made equal to the nominal average amplified noise level at the output of amplifier 402, whenever broadband limiting IF amplifier 104 is actually limiting in response to the receipt of a signal pulse of sufficient amplitude to cause limiting thereof.

In a first case where the input on conductor 400 is obtained from noise level channel 106, the application of clamp return potential 428 to the input to the integrator occurs whenever the output from comparator 404 manifests that the noise level on conductor 400 has dropped below a set reference level. This set reference level is determined by the setting of comparator setpoint adjustment potentiometer 430. In response thereto, comparator 404 opens normally closed gate transistor 432, causing clamp return potential 428 to be forwarded to the input of the integrator.

In a second case where the input on conductor 400 is obtained from a common detector, relatively high amplitude signal pulses will also be present on conductor 400 whenever IF amplifier 104 limits. Such high amplitude pulses may be strong enough to saturate amplifier 402, so that no input to the integrator is obtained therefrom during the interval of such high-amplitude pulses. During such intervals clamp return potential 428 is applied to the input of the integrator by having the output from comparator 404 being arranged to open normally closed gate transistor 432 whenever the level on input conductor 400 rises to a preset reference level determined by the setting of comparator set-point adjustment potentiometer 430.

Therefore, noise AGC circuit 112 can be set to work with either an input derived from the output of a noise channel detector, as in FIG. 1, or, in the alternative, derived from the output of a common detector (not shown). In either case, the setting of comparator potentiometer 430 is a function of both the control gain and the nominal signal-noise ratio of asynchronous pulse receiver 100.

The respective polarity of the input noise, signals, or gain control inputs can be alternatively either positive or negative because the respective amplifier, comparator, clamp and integrator polarity may be selected for proper input and/or output polarities.

Considering now the operation of asynchronous pulse receiver 100, reference is made to FIG. 5. FIG. 5 is a graph showing the relative pulse amplitude of a group of received asynchronous pulses in a stream of such asynchronous pulses as may be encountered in the SECANT system. Each of the pulses has the same short duration of about 1 microsecond. However, the relative time of occurrence of each successive pulse in the stream and the relative amplitude of that pulse within predetermined system limits is randomly distributed. In particular, the time difference between the occurrence of successive pulses may be relatively small (as is the duration between the occurrence of pulse 501 and pulse 500), may be relatively long (as is the case between the time of occurrences of pulse 503 and 502), or two successive pulses may be contiguous with each other (as is the case between the time of occurrence of pulse 502 and pulse 501). Further, as shown in FIG. 5, the dynamic range of the relative amplitude of the pulses in the asynchronous stream of the SECANT system is very large, extending over a range of 45 db (which is equivalent to an amplitude ratio of approximately 177). However, asynchronous pulse receiver 100 must be able to resolve the individual pulses of such a stream of asynchronous pulses picked up by antenna 104 and applied to the input thereof. Further, since an aircraft forming part of the SECANT system and equipment with asynchronous pulse receiver 100 may move from regions of relatively low ambient noise to regions of relatively high ambient noise, the high resolution capability of pulse receiver 100 must be independent of the noise level at its input over wide limits.

The amplitude of signal pulses at the output of broadband limiting IF amplifier 104 is equal to the difference between the level of the output of amplifier 104 during the occurrence of a signal pulse and a background reference noise level at the output of amplifier 104. For relatively high amplitude received pulse signals, such as those transmitted from other aircraft in the SECANT system which are normally closer than one-half of a given maximum range, amplifier 104 will limit, and the output level of amplifier 104 at all such times will have a certain predetermined maximum value. The amplitude of such a pulse signal, which is the difference between this certain predetermined value and the background noise level will depend upon the value of the background noise level of the output of amplifier 104. However, when a received pulse has an amplitude insufficient to cause limiting of amplifier 104, such as a pulse transmitted from an aircraft of the SECANT system which is normally located at more than half maximum range limit, the exact level of such a signal pulse at the output of amplifier 104 will depend upon the amplitude of the received pulse, but always will be in a range intermediate the background noise level and the certain predetermined level which occurs when IF amplifier 104 limits. The amplitude of such a pulse, which is the difference between its level and the background noise level, therefore also will depend upon the background noise level, as it did in the limiting case.

Thus, since the background noise level is employed as a reference at the output of amplifier 104, this reference background noise level at the output of amplifier 104 should remain substantially constant and independent of the actual noise level at the input to asynchronous pulse receiver 100. This is substantially achieved in the present invention by feeding back a noise AGC voltage to control the gain of broad-band limiting IF amplifier 104, as described above.

The input noise level of asynchronous pulse receiver 100, in addition to being primarily determined by the noise energy picked up by antenna 104, is also affected by the input white noise inherently generated across the input resistance of asynchronous pulse receiver 100. As is known, the intensity of such generated input white noise is a function of the temperature of the input resistance. Since it is desirable, although not essential, that the amplitude of the protected signal pulses at the output of signal channel detectors 110 to independent of input white noise, and since the gain broad-band limiting IF amplifier 104 is controlled by the total noise signal including the input white noise, the use of temperature compensation circuit 108, connected either as shown in FIG. 1 or as shown in FIG. 2, is desirable to overcome the effects of changes in the generated input white noise due to changes in temperature. This is accomplished by controlling the attenuation of an attenuator or, in the alternative, controlling the gain of an amplifier in temperature compensation circuit 108, in accordance with a signal derived from a sensor which senses the ambient temperature of pulse receiver 100. Such a sensor is preferably located in the vicinity of the input resistance of pulse receiver 100.

In general, as input noise increases, the receiver gain is reduced until the detected noise assumes its original level. Conversely, if the input noise decreases, the receiver gain is increased. Therefore, the receiver gain is automatically referenced with input noise without undue effects from varying pulse signal amplitudes, rates or time positions. However, any change in the gain of broad-band limiting IF amplifier 104 due to variations in the portion of the input noise level resulting from changes in temperature of the input resistance of asynchronous pulse receiver 100 is countered by a substantially equal and opposite variation attenuation or gain by temperature compensation circuit 108 in either FIG. 1 or FIG. 2. Therefore, the use of temperature compensation circuit 108 ensures that the detected signal pulse amplitudes are not substantially affected by the temperature at the input to pulse receiver 100.

In describing the present invention, it has been assumed that asynchronous pulse receiver 100 is a superhetrodyne and that the broad-band limiting amplifier is an IF amplifier. However it is not essential that pulse receiver 100 be a superhetrodyne receiver or that the broad-band limiting amplifier be an IF amplifier. All that is required is that the broad-band limiting amplifier be a radio wave amplifier serially inserted between the input and output of the asynchronous pulse receiver.

What is claimed is:

1. An asynchronous pulse receiver for receiving and utilizing as a signal a stream of asynchronously-occurring pulses each consisting of a frequency burst of radiowave energy having a given relatively short duration, the distribution of amplitudes among successive pulses of said stream varying over a relatively large dynamic range; said receiver comprising:

a. first means responsive to the receipt of said received stream for forwarding said pulses thereof as an output therefrom;

b. a broad-band, amplitude-limiting, gain-controlled radio-wave amplifier having said output of said first means applied as an input thereto, said radio-wave amplifier having a frequency passband sufficiently broad to substantially preserve said short duration of each of said received pulses of said stream passed therethrough, said radiowave amplifier limiting only in response to a received pulse of said stream having an amplitude in an upper portion of said dynamic range being passed therethrough, said radio-wave amplifier producing an output having an asynchronously-occurring pulse signal component and a noise component in response to said received stream of pulses being applied as a signal input thereto from said first means;

c. signal-utilization means which is responsive to said entire signal component of the output from said radio-wave amplifier;

d. noise-responsive means for deriving an AGC voltage having a magnitude in accordance with only the average intensity of noise applied as an input thereto, said AGC voltage being fed back to said radio-wave amplifier to control the gain of said radio-wave amplifier in accordance with the magnitude thereof, and e. second means for applying the output of said radio-wave amplifier as an input to said signal-utilization means and as an input to said noise-responsive means.

2. The receiver defined in claim 1, wherein said radio-wave amplifier is an IF amplifier and said first means includes the front-end circuits of said receiver.

3. The receiver defined in claim 1, wherein the intensity of said noise component is in part determined by the temperature at the input to said receiver, and wherein said second means includes temperature-compensation means for compensating for any effect on the gain of said radiowave amplifier due to said part of said noise component.

4. The receiver defined in claim 3, wherein said second means includes fourth means for directly coupling the output of said radio-wave amplifier to the input of said noise-responsive means, said output of said radio-wave amplifier being coupled to the input of said signal utilization means through said temperature-compensation means.

5. The receiver defined in claim 3, wherein said second means includes fourth means for coupling the output of said radio-wave amplifier to both the input of said noise-responsive means and the input of said signal-utilization means through said temperature compensation means.

6. The receiver defined in claim 1, wherein said passband of said radio-wave amplifier includes a noise channel characterized by the substantial absence in said noise channel of any components of the frequency spectrum of pulses being amplified by said radio-wave amplifier, and wherein said noise-responsive means includes noise detection means turned only to said noise channel.

7. The receiver defined in claim 6, wherein substantially all components of the frequency spectrum of all pulses applied as an input to said radio-wave amplifier are within said passband thereof.

8. The receiver defined in claim 1, wherein said short duration is substantially one microsecond.

9. The receiver defined in claim 8, wherein said radio-wave amplifier has a passband width extending substantially from nine megacycles to thirty megacycles.

10. The receiver defined in claim 1, wherein said dynamic range is substantially forty-five decibels.

11. The receiver defined in claim 1, further including independent gain control means coupled to said radio-wave amplifier for further controlling the gain of said radio-wave amplifier in addition to and independent of said automatic gain control.

12. The receiver defined in claim 1, wherein said noise-responsive means includes detection means responsive to at least said noise component of the output of said radio-wave amplifier applied as an input thereto to derive a detected voltage, a low-frequency-limited amplifier, a comparator and reference level setting means for producing an output only in response to the input level thereto reaching a reference level, fourth means for applying said detected voltage as an input to both said low-frequency-limited amplifier and said comparator, an integrator having its input coupled to the output of said low-frequency-limited amplifier for integrating the output thereof, fifth means coupled to both said comparator and said low-frequency-limited amplifier for clamping the output of said low-frequency limited amplifier to a fixed return potential only in response to an output from said comparator, and sixth means for applying the output of said integrator as said automatic gain control voltage to said radio-wave amplifier.

13. The receiver defined in claim 12, wherein said reference level is set to produce an output from said comparator in response to said detected voltage indicating that said radio-wave amplifier is limiting, and wherein the value of said fixed return potential is equal to a nominal average noise level at the output of said low-frequency-limited amplifier.

14. The receiver defined in claim 12, wherein said sixth means includes seventh means for amplifying the output of said integrator and applying the output of said seventh means as said automatic gain control voltage to said radio-wave amplifier.

* * * * *

UNITED STATES PATENT OFFICE
CERTIFICATE OF CORRECTION

Patent No. 3,848,191 Dated November 12, 1974

Inventor(s) Leonard Hugo Anderson

It is certified that error appears in the above-identified patent and that said Letters Patent are hereby corrected as shown below:

Column 3, line 48, change "110" to --100--

Column 4, line 48, change "grain" to --gain--

Column 4, line 68, change "contact" to --constant--

Column 5, line 6, change "159" to --1590--

Column 5, line 44, change "lever" to --level--

Column 6, line 8, change "valves" to --values--

Column 8, line 28, change "to" to --be--

Column 10, line 11, Claim 6, change "turned" to --tuned--

Signed and sealed this 18th day of February 1975.

(SEAL)
Attest:

RUTH C. MASON
Attesting Officer

C. MARSHALL DANN
Commissioner of Patents and Trademarks